Figure 16:
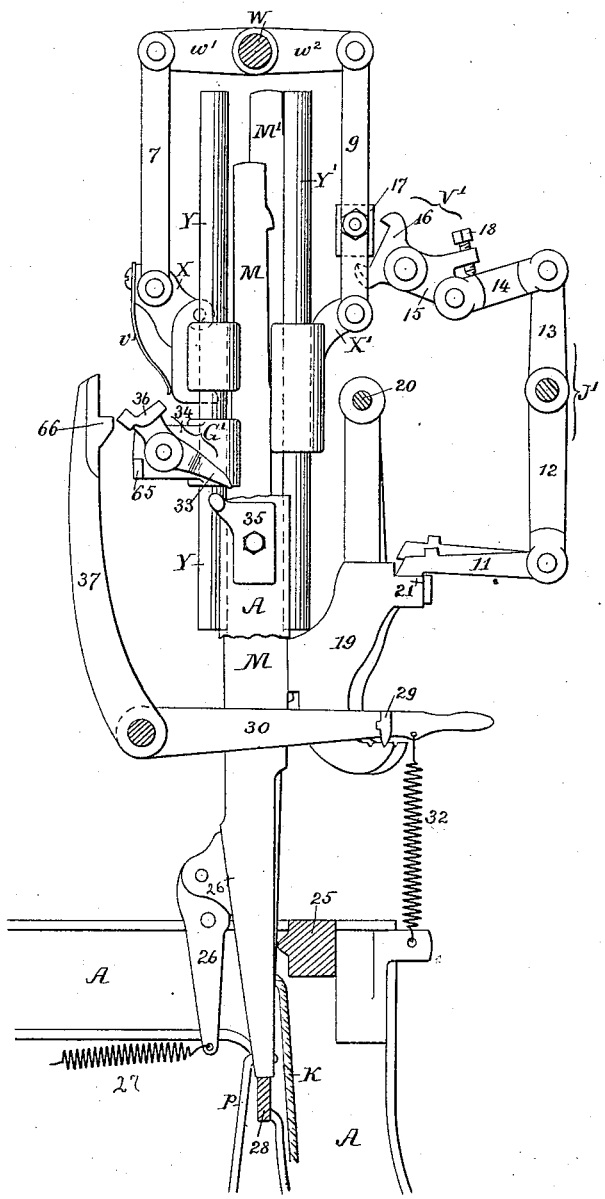

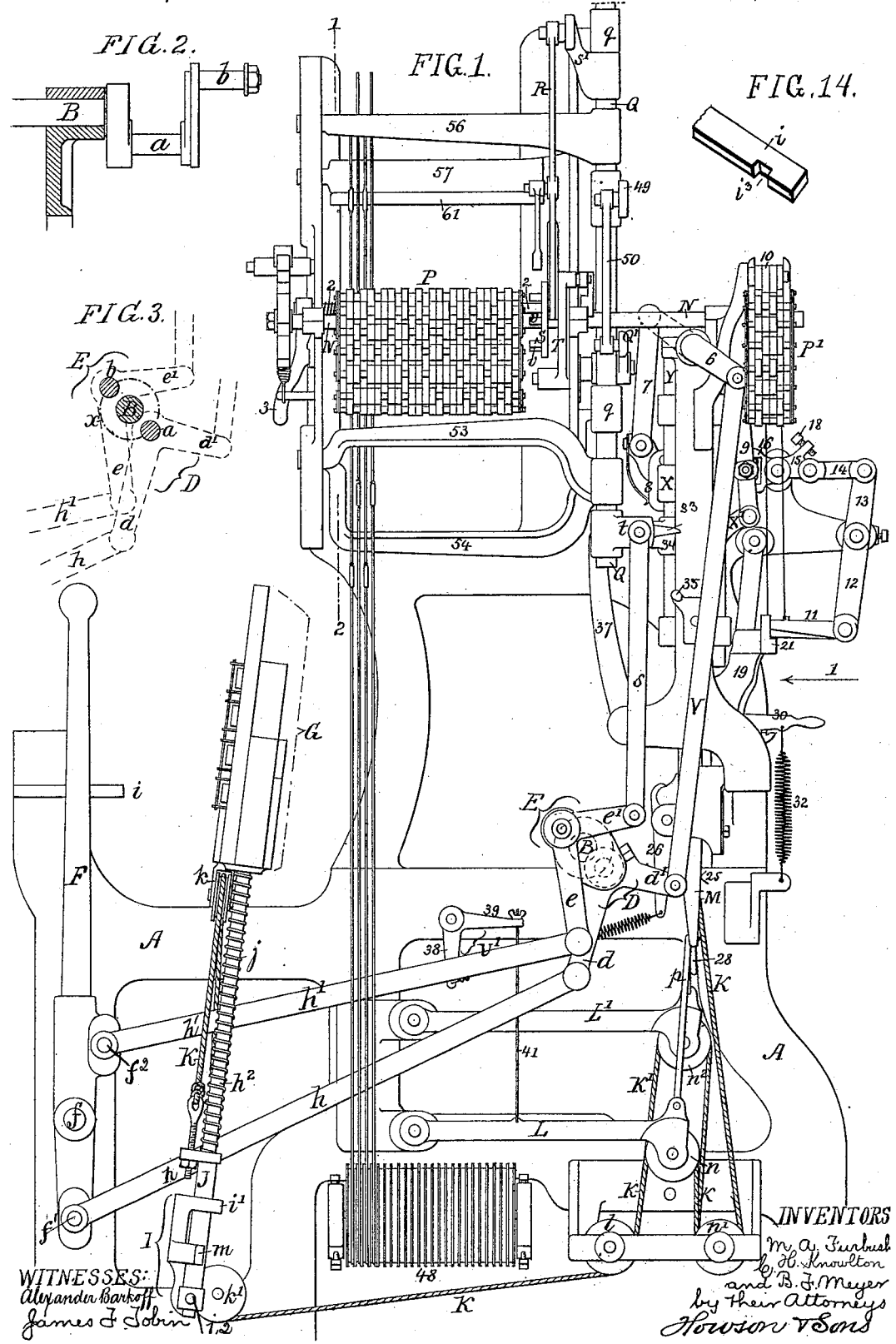

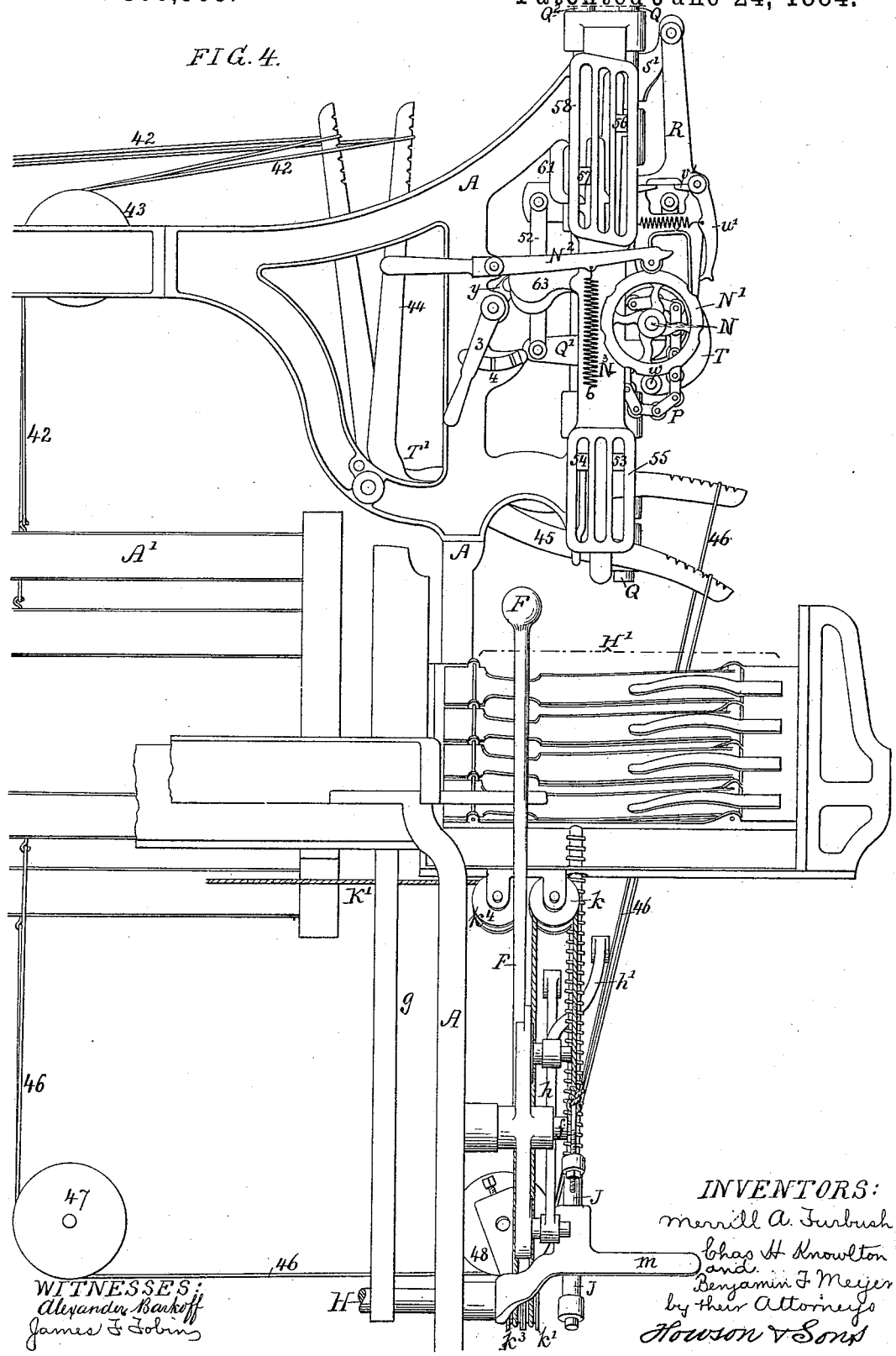

(No Model.) 7 Sheets—Sheet 3.
M. A. FURBUSH, C. H. KNOWLTON & B. F. MEYER.
LOOM.
No. 300,963. Patented June 24, 1884.
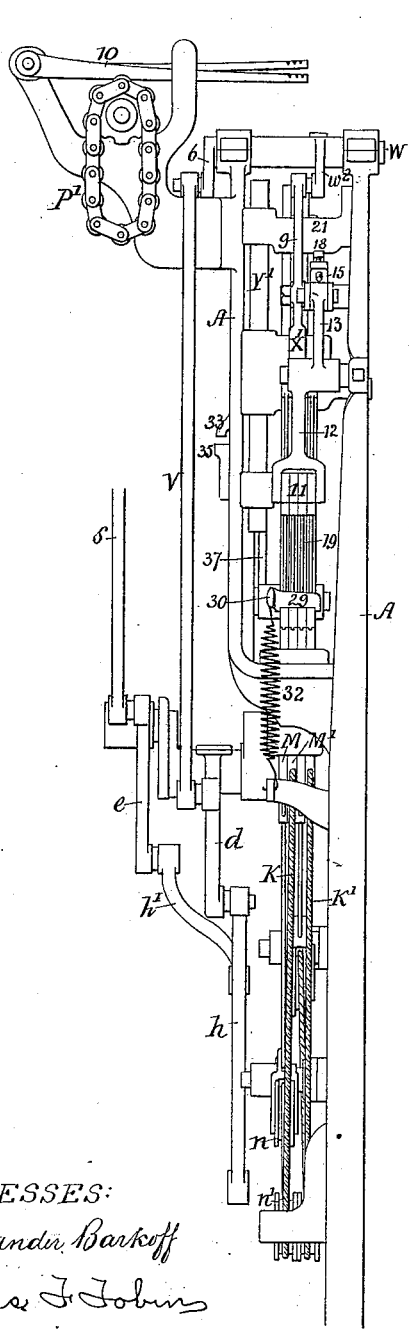
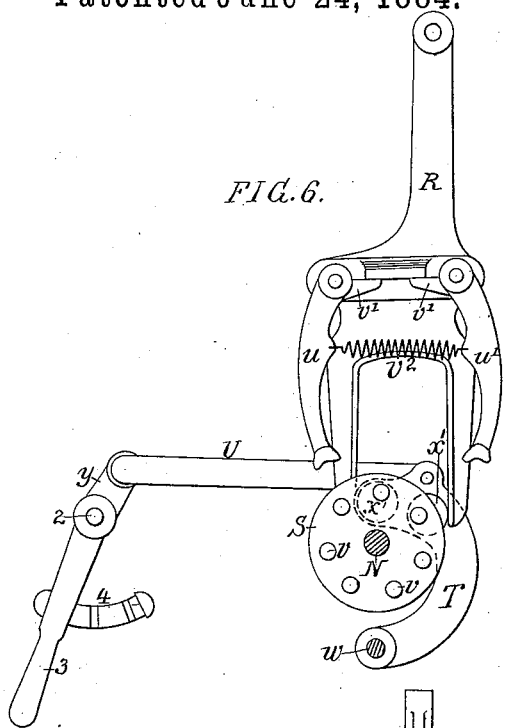
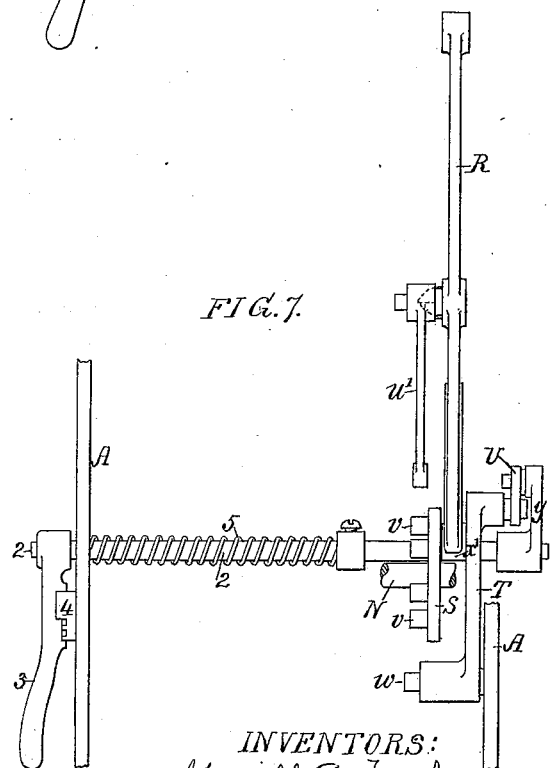
WITNESSES:
Alexander Barkoff
James F. Tobin
INVENTORS:
Merrill A. Furbush
Charles H. Knowlton
and Benjamin F. Meyer
by their Attorneys
Howson & Sons

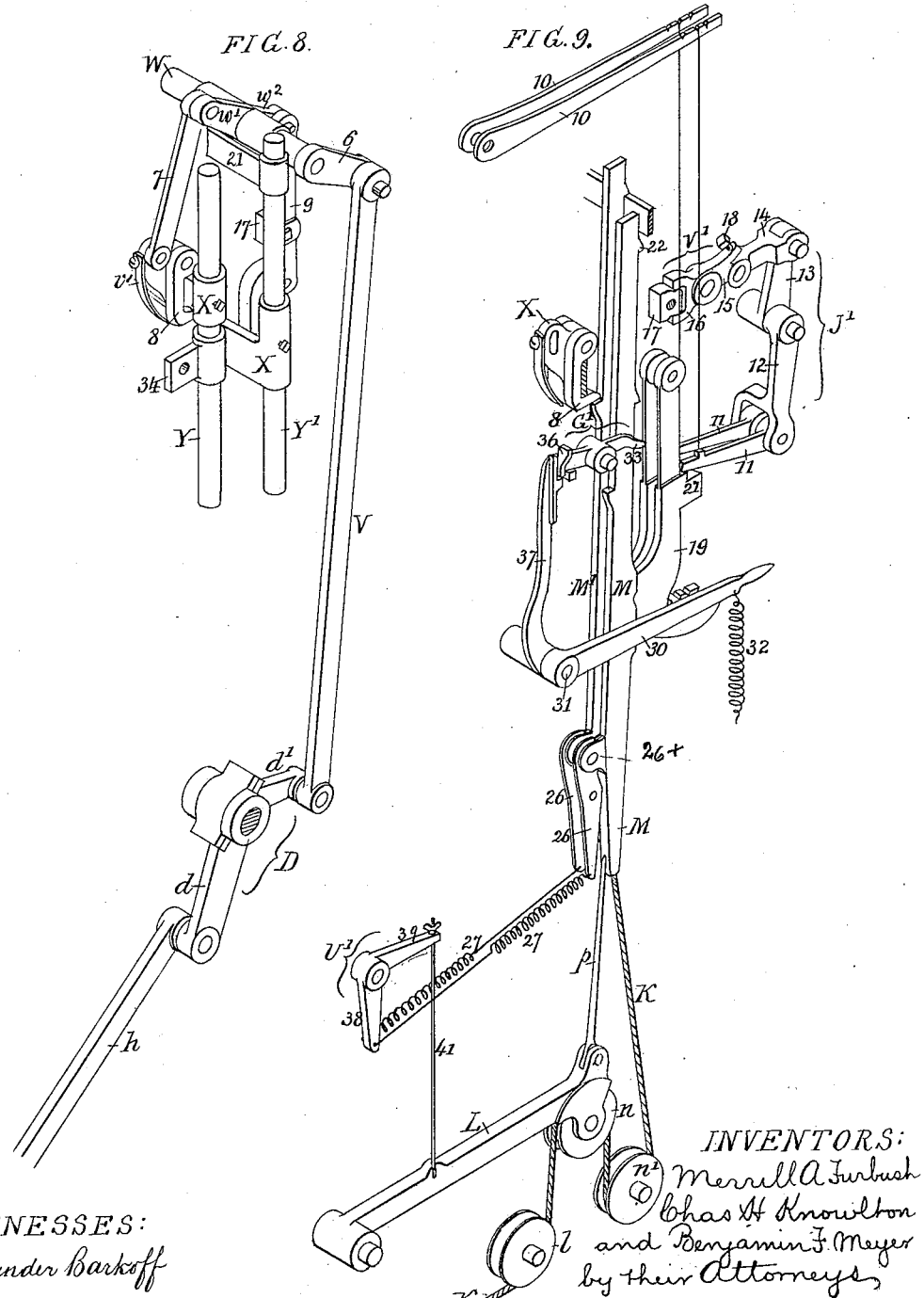

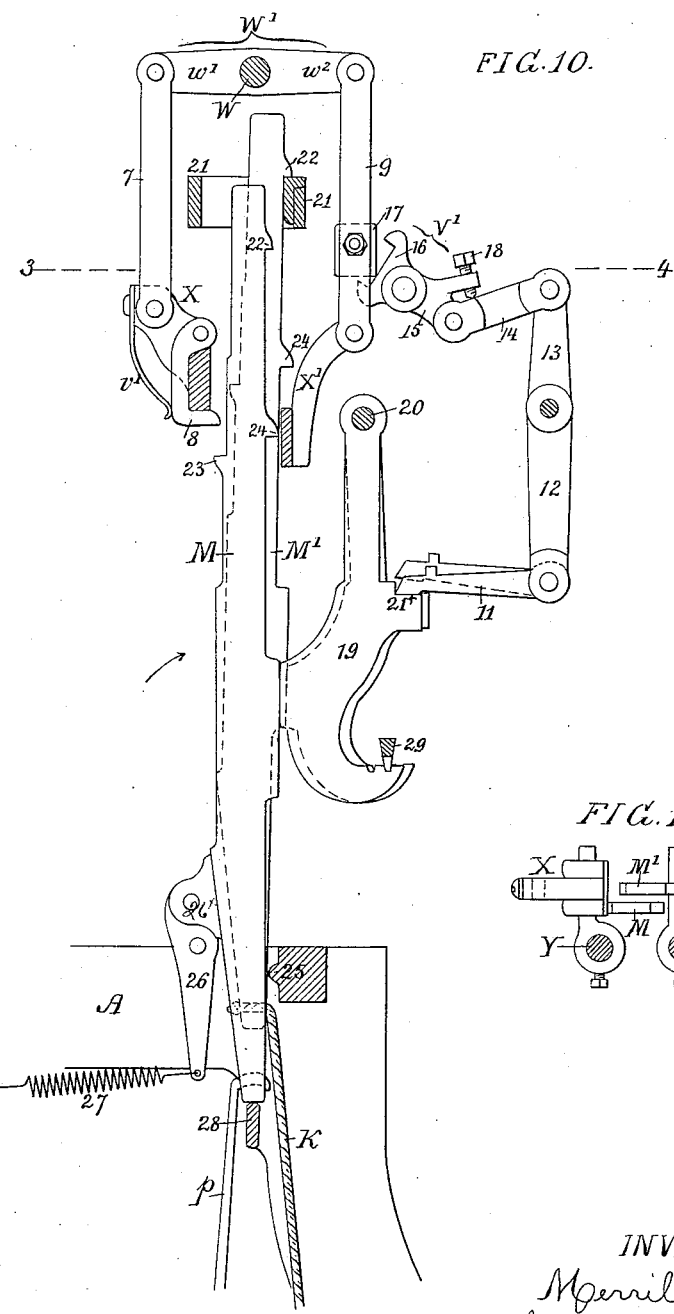

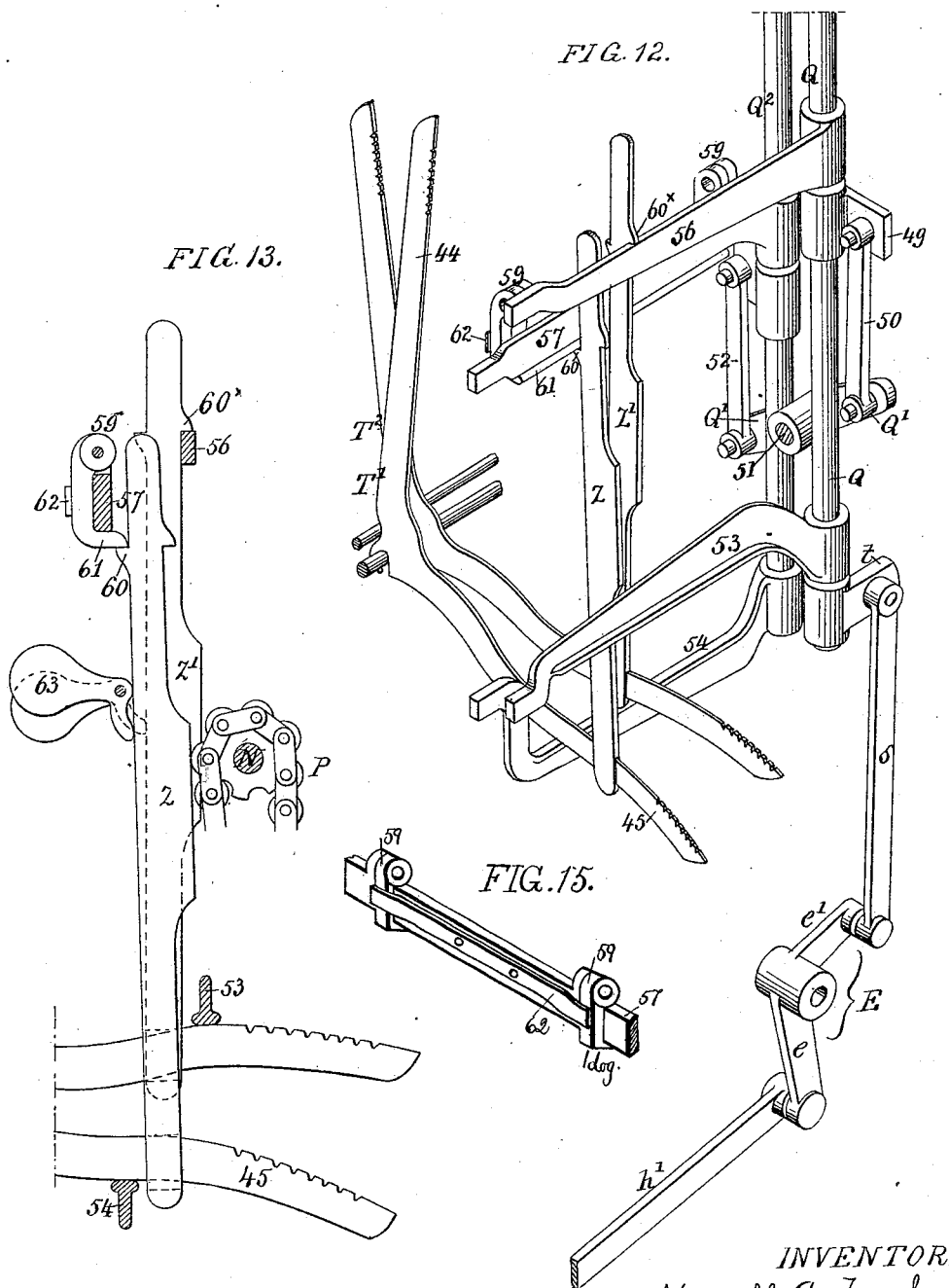

(No Model.) 7 Sheets—Sheet 7.
M. A. FURBUSH, C. H. KNOWLTON & B. F. MEYER.
LOOM.
No. 300,963. Patented June 24, 1884.

Witnesses
John M. Clayton.
James J. Tobin

Inventors
Merrill A. Furbush
Charles H. Knowlton
and
Benjamin F. Meyer
by their Attys
Howson and Sons

UNITED STATES PATENT OFFICE.

MERRILL A. FURBUSH, OF PHILADELPHIA, PENNSYLVANIA, AND CHARLES H. KNOWLTON AND BENJAMIN F. MEYER, OF CAMDEN, NEW JERSEY, ASSIGNORS TO SAID FURBUSH AND CHARLES A. FURBUSH, OF PHILADELPHIA, PENNSYLVANIA.

LOOM.

SPECIFICATION forming part of Letters Patent No. 300,963, dated June 24, 1884

Application filed July 7, 1883. (No model.)

*To all whom it may concern:*

Be it known that we, MERRILL A. FURBUSH, CHARLES H. KNOWLTON, and BENJAMIN F. MEYER, all citizens of the United States, the said FURBUSH residing in Philadelphia, Pennsylvania, and the said KNOWLTON and MEYER residing in Camden, Camden county, New Jersey, have invented certain Improvements in Looms, of which the following is a specification.

Our invention relates to that class of fancy-looms in which are embodied mechanism for operating drop-boxes and devices controlled by a pattern-chain for actuating the heddles, the main objects of our invention being, first, to avoid gear-wheels, clutches, and other appliances which are liable to get out of order, and to which much of the undue friction and the shocks and jars which accompany the movements of looms of this class as ordinarily constructed may be attributed; and, second, to afford facilities for correcting any imperfection in the fabric caused by wrong picks.

The devices and combinations of parts and the manner in which they are operated for the attainment of these objects are so fully described and claimed hereinafter that preliminary explanation will be unnecessary.

In the accompanying drawings, Figure 1, Sheet 1, is a side view of a fancy-loom with our improvements. Fig. 2 illustrates part of the crank-shaft and its crank-pins; Fig. 3, a diagram showing the relation of the crank-pins to the shaft; Fig. 4, Sheet 2, a front view of part of the loom, portions of the loom being omitted in order to avoid confusion; Fig. 5, Sheet 3, a rear view of part of the loom, looking in the direction of the arrow 1, Fig. 1, and showing the mechanism for operating the drop-boxes; Figs. 6 and 7, views illustrating the devices for actuating and reversing the chain-shaft; Figs. 8 and 9, Sheet 4, detached perspective views of the drop-box-operating mechanism; Fig. 10, Sheet 5, a side view, partly in section, of the said mechanism; Fig. 11, a sectional plan on the line 3 4, Fig. 10; Fig. 12, Sheet 6, a perspective view of the heddle-operating mechanism; Fig. 13, a vertical section on the line 1 2, Fig. 1, showing parts of the heddle-operating mechanism; Fig. 14, Sheet 1, a perspective view of part of the plate for retaining the hand-lever shown in Fig. 1; and Fig. 15, Sheet 6, a detached perspective view of part of Fig. 1. Fig. 16, Sheet 7, is a side view of part of the drop-box mechanism, illustrating details in the construction of the same.

Referring to Fig. 1, A represents one of the end frames of the loom, and B the crank-shaft, which in that figure is represented by a dotted circle. On referring to the detached view, Fig. 2, it will be seen that this shaft, which turns in suitable bearings in the end frames of the loom, has two cranks, of which $a$ and $b$ are the two pins, the relation of the latter to each other and to the shaft being shown in the diagram, Fig. 3. A bell-crank lever, D, is loose on the crank-pin $a$, and a bell-crank lever, E, on the crank-pin $b$, so that as the shaft B revolves, the two bell-crank levers will be carried round with the said pins, the centers of the latter pursuing the annular course indicated by the dotted circle $x$, Fig. 3. Both of these bell-crank levers are under the control of a hand-lever, F, which is pivoted at $f$ to the end frame A of the loom, the arm $d$ of the bell-crank lever D being connected by a rod, $h$, to a pin, $f'$, on the said lever F below the pivot-pin $f$, and the arm $e$ of the bell-crank lever E being connected by a rod, $h'$, to a pin, $f^2$, on the same lever above the said pivot-pin $f$. The lever F is stationary as long as the loom is doing accurate work, and is operated occasionally only, and then under the circumstances explained hereinafter. The lever may be retained by a notched plate, $i$, Fig. 14, and may be pulled laterally from the notch $i^3$ whenever it has to be operated; or any other device for retaining the lever and setting it at liberty may be adopted.

The drop-box mechanism derives its motion from the bell-crank lever D, and the heddle mechanism from the bell-crank lever E, and the movements of both levers are due partly to the rotating of the crank-pins and partly to the control which the lever F has over the levers, and which determines what movement shall be imparted to them by the said crank-pins. We will in the first instance describe the mechanism through the medium of which the said bell-crank lever D is caused to operate the drop-boxes of the loom, reference being had to Figs. 1, 4, 5, 8, and 9.

The legs $g$ of the lathe G are pivoted to a shaft, H, which has its bearings in the opposite end frame of the loom, one of these legs being shown in Fig. 4, but omitted in Fig. 1, in order to avoid confusion in that view, for the same reason the usual devices for operating the lathe from the crank-shaft have been omitted.

At each end of the lathe there are suitable guides for a drop-box, H', the detailed construction of which it will not be necessary to describe, as it may be similar to those of other drop-box looms, and forms no part of our present invention. It will suffice to remark that each drop-box has, in the present instance, four compartments for as many shuttles, and is attached to a vertical rod, $h^2$, which vibrates with the lathe in the usual manner.

A frame, I, Figs. 1 and 4, which is secured to and rocks with the shaft H, has a guide, $i'$, for a sleeve, J, through which passes the above-mentioned drop-box rod $h^2$, which below the sleeve is provided with a nut or collar, $i^2$, a spiral spring, $j$, surrounding the rod $h^2$, being interposed between the sleeve and under side of the drop-box, and this spring being sufficiently rigid to insure the rising of the drop-box when the sleeve is elevated, but yielding whenever there is any obstruction to prevent the box from being raised. An arm, $m$, forming part of and projecting from the rock-frame I, carries the lower end of the picker-staff, which, together with mechanism for operating it, has not been shown in the drawings, as it forms no part of our present invention.

One end of a chain or cord, K, is attached to the sleeve J, as shown in Fig. 1, passes over a pulley, $k$, hung to a pin on a hanger secured to the under side of the lathe, the cord passing round a similar pulley, $k'$, on a pin attached to the frame of the loom, the cord passing thence to a pulley, $l$, the journals of which have their bearings in an attachment to the frame, over a pulley, $n$, carried by an arm, L, downward round a pulley, $n'$, to one of the jacks M', referred to hereinafter.

At the end of the loom opposite to that shown in the drawings there is a drop-box and appliances connected therewith precisely like that described, and to the sleeve J of the rod $h^2$ of that box is attached a cord or chain, K', extended beneath the lathe, as shown in Fig. 4, passing over a pulley, $k^4$, adjoining the above-mentioned pulley $k$, round a pulley, $k^3$, on the same pin as the pulley $k'$, round a pulley adjoining the pulley $l$, round a pulley, $n^2$, carried by an arm, L', downward and round a pulley adjoining the pulley $n'$, and upward to another jack M' of the series referred to hereinafter.

The arms L L' are pivoted to the frame of the loom, and the outer end of each arm is connected by a rod, $p$, to a smilar jack, M.

It will be well at this point to refer to the pattern-chain shaft N, which is adapted to suitable bearings in attachments to the frame of the loom, this shaft carrying two pattern-chains, P P', the former appertaining the heddle mechanism, and the latter to the drop-box mechanism.

The arm $e'$ of the lever E is connected by a rod, $s$, to an arm, $t$, on a slide-rod, Q, which is adapted to guides $q$ on the frame-work of the loom, as shown in Figs. 1, 4, and 12. To a projection, $s'$, on the upper end of this reciprocating rod Q is hung a swinging frame, R, to which are pivoted two pawls, $u\ u'$, each adapted at its lower end to strike against pins $v$ on a disk, S, which is secured to the aforesaid chain-shaft N. A toe, $v'$, on each pawl, by coming in contact with part of the swinging frame, has its inward movement limited; but it can yield outwardly, as the pawls are connected together by a spring, $v^2$. Which of the two pawls shall act on the pins of the disk is determined by mechanism shown in Figs. 6 and 7. A curved arm, T, is pivoted at $w$ to the frame of the loom, and this arm carries two rollers, $x'\ x'$, over both of which passes the forked lower end of the above-mentioned rocking frame R, which, by the adjustment of the said curved arm, can, through the medium of the rollers $x$, be moved to a position where the pawl $u$ only will act on the pins of the disk, or where the other pawl, $u'$, only will act on the same, or where neither pawl will come in contact with the pins as the rocking frame reciprocates with the above-mentioned slide-rod Q.

Different devices may be used for adjusting the said curved arm T. In the present instance it is connected by a rod, U, to an arm, $y$, on the shaft 2, which has its bearings in the frame-work of the loom, the shaft being provided with a handle, 3, adapted to notches in a fixed segment, 4, and a spring, 5, bearing on a collar on the shaft and tending to maintain its handle in the notch to which it has been adjusted, but permitting the handle to be withdrawn from a notch when it becomes necessary to adjust it to another notch.

It will now be seen that the chain-shaft N may be moved intermittently in either direction, or its movement arrested while the rocking frame and its pawls continue to reciprocate with the slide-rod Q, which, as before remarked, derives it motion from the bell-crank lever E.

On referring to Fig. 4 it will be seen that the chain-shaft N is provided with a wheel, N', in the periphery of which are depressions for receiving a roller on the end of an arm, N², pivoted to the frame of the loom, a spring, N³, serving to depress this arm. The object of this detent mechanism is to restrict the movement of the said chain-shaft.

It should be remarked that the pattern-chains are similar in construction to those for actuating the jacks in ordinary looms, and are adapted to ordinary chain-wheels on the chain-shaft.

We will now proceed to describe the mechanism by which the bell-crank lever D is caused to actuate the drop-box in obedience to the action of the pattern-chain P', reference being had to Figs. 1, 4, 5, 8, 9, 10, and 11.

It should be understood, in the first place, that there are two jacks, M M', (best observed in the perspective view, Fig. 9, and side view, Fig. 10,) for the drop-box H' on that side of the loom which we have illustrated, and that there are two similar jacks adjoining those lettered M M' for the drop-box on the opposite end of the lathe. To prevent confusion we have shown in the above-mentioned views, Figs. 9 and 10, the two jacks only which appertain to the drop-box H', and for the time being shall restrict our description to these jacks, and to the mechanism connected therewith.

As shown in Fig. 9, the lever L is connected by a rod, $p$, to the jack M, and the cord K, previously referred to, is connected to the jack M'. By mechanism hereinafter explained the jacks are operated in obedience to the action of the pattern-chain—that is to say, each jack M or M' may be raised or lowered independently of the other, or raised and lowered together with the other; but it should be understood that each jack is always, when not in actual motion, either at the limit of its upward or the limit of its downward movement, between which there is no stoppage of either jack. When the jack M is elevated, the jack M' being stationary, the drop-box H will be raised through the medium of the rod $p$, lever L, and cord K to the extent of two of its compartments. When the jack M' is raised, the jack M being stationary, the drop-box will be raised through the medium of the cord K to the extent of one compartment, and when both jacks are raised the drop-box will receive its greatest movement—that is, to the extent of three compartments. Thus by the operation of the jacks the drop-box may be moved to any position which the pattern-chain may determine.

We will now describe the mechanism for operating the jacks before we explain the effect which the pattern-chain has on that operation.

Referring to Figs. 1 and 8, it will be seen that the arm $d$ of the bell-crank lever D is connected by a rod, $v$, to an arm, 6, on a rock-shaft, W, which has its bearing in any suitable attachment to the frame-work. To this shaft W is secured a lever, W', (see Fig. 10,) one arm, $w'$, of which is connected by a link, 7, to a cross-head, X, which is secured to a vertical rod, Y, the latter being adapted to guides on the frame-work, these devices being shown in Fig. 1, but more clearly in the perspective view, Fig. 8, and in the sectional plan, Fig. 11. A dog, 8, Figs. 8, 9, and 10, is pivoted to the cross-head X, a spring, $v'$, tending to maintain the said dog in the position shown in Fig. 10. The arm $w^2$ of the lever W' is connected by a link, 9, to another cross-head, X', which is secured to another slide-rod, Y', Figs. 10, 11, and 16. The object of pivoting the dog 8 to the cross-head X, and of attaching the spring $v'$ to the same, is to permit the said dog to yield when a jack is out of place and presents as an obstacle to the movement of the dog its projection 23. It will thus be seen that as the bell-crank lever D operates a vertical reciprocating motion in contrary directions will be imparted to the two cross-heads X X' and to the two slide-rods Y Y'.

We will now proceed to explain the influence which the pattern-chain P' has in determining which of the jacks shall be depressed by the dog 8 of the cross-head X, and which of the jacks shall be raised by the cross-head X'.

Referring to Fig. 5, it will be seen that arms 10, pivoted to a bracket on the frame, rest on the endless chain P'. In this view all four jacks are shown—two appertaining to the drop-box at one end of the loom and two to the drop-box at the opposite end of the loom—and there are four of these arms 10—one for each jack. We will, however, continue to restrict our explanation to two jacks. Each of these arms 10 is connected by a rod to a finger, 11, pivoted to an arm, 12, of a lever, J', which is hung to a pin on the frame of the loom, the upper arm, 13, being connected by a link, 14, to one arm, 15, of a lever, V', which is also pivoted to the frame, a block, 17, on the link 9 fitting freely into the forked arm 16 of the said lever V', the arm 15 of which has a small set-screw, 18, for limiting the outward movement of the fingers 11, and for affording a means of regulating this movement. As the rod 9 reciprocates, its block 17 actuates the lever V', and consequently operates the lever J' and fingers 11. Arms 19—one for each jack—are pivoted to the frame-work at 20, and each arm has a shoulder, 21×, with which one of the fingers will come in contact when permitted by the pattern-chain. The upper ends of the jacks pass through a yoke, 21, secured to the frame-work of the machine, and on one edge of this yoke rests a lug, 22, on each jack when the latter is elevated. When one of the jacks has been forced outward by the action of one of the fingers 11 on one of the arms 19, it will be freed from the yoke 21, and will be depressed by the dog 8 of the cross-head X, the said dog coming in contact with a lug, 23, on the jack. The jack is elevated by the cross-head X', which comes in contact with a lug, 24, on the jack and raises the latter, so that it again catches on the edge of the yoke. Each jack near its lower end bears against a rounded projection, 25, on an attachment to the frame, and there is for each jack a lever, 26, pivoted to an attachment on the frame A of the loom, the short arm of the said lever being provided with a shoe, 26×, which is caused by a spring, 27, acting on the long arm of the lever 26, to bear against the jack at a point above the projection 25, the lever and spring having consequently a tendency to force the jack in the direction of the arrow, Fig. 10, and cause its lug 22 to catch on the edge of the yoke 21. A bar, 28, attached to the frame-work, serves as a stop to prevent the depression of the jacks below a given point. The upturned end of each arm 19 has two notches for a retainer, 29, which is on a lever, 30, pivoted at 31 to the frame of the machine, and depressed by a spring, 32, the same retainer serving for all the arms 19. A trigger, G′, is pivoted to a projection, 34, on the vertically-reciprocating rod Y, and on the descent of this rod one arm, 33, of this trigger comes in contact with a stop, 35, on the frame, (see Fig. 1,) and this causes the other arm, 36, of the trigger to move into position to actuate, during the rise of rod Y, an arm, 37, which is a continuation of the lever 30, thereby freeing the arms 19 from the control of the retainer. This may be more fully explained in connection with Fig. 16, Sheet 7. During the descent of the rod Y the arm 33 of the lever G′ comes in contact with the stop 35 on the frame of the loom, and the lever G′ is brought to a horizontal position, its movement being limited by a stop, 65, on the projection 34; but it must be understood that in making this movement the arm 36 of the lever G′ does not disturb the arm 37. The arm 36 of the lever G′, however, when the rod Y has reached the limit of its downward movement, extends beneath a projection, 66, on the said arm 37, and this projection is inclined on the under side, so that, as the rod Y rises, the arm 36 of the lever G′, acting on the inclined under side of the said projection, will actuate the arm 37, and the retainer 29 will leave the notches in the upturned ends of the pivoted arms 19, which will thus be released, only temporarily, however, for as soon as the arm 36 of the lever G′ is clear of the said projection 66 on the arm 37 the said arm will be restored by the spring 32 to its first position. The object of the retainer is to lock each of the arms 19 after each of its movements, the retainer fitting in one notch after an arm has been moved in one direction, and into the other notch after an arm has been moved in the opposite direction.

It must be remembered that the jacks M M′ have during their operations both a vertical movement, occasioned by the action of the cross-heads X X′, and a slight lateral movement, occasioned by the pressure of the shoes 26× on the upper ends of levers 26, and this lateral movement causes the arms 19 to be pushed outward when the retainer 29 is raised.

It will now be seen that the jacks are actuated by the cross-heads X X′, the pattern-chain determining, through the medium of the devices described, which of the jacks shall be operated upon.

Referring to Fig. 9, it will be seen that the long arm of each lever 26 is connected by a spring, 27, to one arm, 38, of a bell-crank lever, U′, which is pivoted to the frame of the machine, and the other arm, 39, of which is connected by a rod, 41, to the arm L. The short arm of the lever 26, for each jack, carries a pivoted shoe, 26×, which bears against the wedge-shaped lower end of the jack, and serves in a measure to retard the descent of the same, and when the lever L is depressed by the depression of the jack M, the friction exerted on each jack by the shoe 26× of the lever 26, connected to the said lever L, is increased through the medium of the rod 41, lever U′, and spring 27, thus preventing too rapid an operation of the drop-boxes. The arm L, moreover, at the moment when it is elevated by the elevation of the jack M, diminishes the effect of the spring 27 on the lever 26 appertaining to each jack, and consequently reduces the friction of the jack both on the yoke 21 and projection 25. In further explanation of this part of our invention it should be stated that there is only one lever U′ for the two levers 26 of the two jacks M M′. When the jack M′ is depressed to lower the shuttle-box to the extent of one of its compartments, the arm L, as well as the lever U′, remains undisturbed, and consequently there can be no alteration of the friction of the shoe of the lever 26 on the said jack M′, for increased friction is not so essential when the jack M′ is operated to lower the box to the extent of one compartment, as when both jacks are operated to lower the box to the extent of three compartments. If both jacks are operated to lower the shuttle-box to the extent of three compartments, there will be an increased friction on both jacks, just as an increased friction is imparted to the jack M when operated to lower the shuttle-box to the extent of two compartments.

We will now proceed to describe the heddle mechanism, reference being had to Figs. 1, 4, 12, and 13.

The upper bar of each heddle-frame A′ is connected by cords 42, passing over pulleys 43, Fig. 4, to an arm, 44, of a bell-crank lever, T′ or T², pivoted to the frame of the loom, and the lower bar of each heddle-frame is connected by a cord, 46, passing round pulleys 47 and 48, to the other arm, 45, of the same lever, T′ or T².

Referring to Figs. 12 and 13, and to the slide-rod Q, which, as remarked above, has a projecting arm, t, connected by a rod, s, to the arm e′ of the bell-crank lever E, it will be seen that an arm, 49, secured to the said slide-rod Q, is connected by a rod, 50, to one arm of a rocking lever, Q′, which is pivoted to a pin, 51, secured to the frame-work of the loom, the other arm of this rocking lever being connected by a rod, 52, to an arm projecting from the slide-rod Q², so that as the bell-crank lever E' is vibrated the rods Q and Q² will reciprocate in contrary directions.

Two only of the bell-crank levers, T' and T²—one for each heddle—are shown in Fig. 12, and two jacks, Z Z'—one for each heddle-lever—the arm 45 of each bell-crank lever passing freely through a slot in the lower end of one of the jacks.

To the reciprocating rod Q is secured an arm, 53, which extends across and above the arms 45 of the bell-crank levers, and the rod Q² is provided with a similar arm, 54, which extends beneath the said arms 45 of the bell-crank levers. The outer ends of the arms 53 and 54 are guided by the slotted plate 55, (shown in Fig. 4,) the said plate being secured to the frame-work of the loom. The rod Q is provided with another arm, 56, and the rod Q² with an arm, 57, the outer ends of these arms being guided by a slotted plate, 58, Fig. 4, secured to the frame-work of the loom. The object of the arm 56 is to raise any jack which may be in such a position that its lug 60× will be in the path of the arm as the latter is elevated.

To the arm 57 is pivoted at 59, Fig. 12, a bar, 61, which acts on the lugs 60 of the jacks to depress the latter, a spring, 62, (shown in the detached view, Fig. 15, Sheet 6,) at the rear of the bar tending to maintain the same in contact with the bar 57.

The object of the arms 53 and 54 is to equalize the heddle-levers—that is to say, to bring them into the mid-position, or position of closed shed, after each operation and before the pattern-chain acts to adjust them for the next shed.

There is for each jack a weighted lever, 63, pivoted to any suitable attachment of the frame, a short arm of each lever tending to force its jack against the pattern-chain P, which has heretofore been referred to, and which is adapted to the usual chain-wheel secured to the shaft N. This chain determines which of the jacks shall be moved within the range of the pivoted bar 61 of the arm 57, or within the range of the arm 56.

It will not be necessary to enter into a further explanation of the operation of the above-described heddle mechanism, as its action will be readily understood by those familiar with looms of the class to which our invention relates.

As regards the first object of our invention, no gear-wheels, clutches, or cams are used in connection either with the drop-box mechanism or heddle mechanism, the several movements being brought about principally by the aid of levers, arms, rods, and ordinary grooved pulleys, the movements of which are accompanied with but little friction. The second object—that of affording facilities for correcting any imperfection in the fabric due to a wrong pick, and for at once resuming the operation of weaving after the correction has been made—may be briefly explained by referring to Figs. 1 and 6 of the drawings. After the stoppage of the loom, when an imperfect pick has occurred and other picks have followed the imperfect one, both the drop-box mechanism and heddle mechanism can be restored to the relative conditions in which they were when the wrong pick occurred, by first throwing out of action the pawl $u$, and putting in action the pawl $u'$, by the mechanism shown in Fig. 6, then releasing the hand-lever F, and by it operating the mechanism described, so as to intermittently turn the chain-shaft N in a direction contrary to that in which it had previously turned, and this will result in restoring the drop-box and heddle mechanism to the condition in which they were when the wrong pick occurred, after which the pawls $u u'$ may be restored to their original positions, and the lever F secured, as before. After each opening of the shed due to the operation of the hand-lever F, a weft-thread is removed, this operation being continued until the imperfect thread is reached and removed, when the loom is again thrown into gear, and the weaving proceeded with.

We claim as our invention—

1. The combination of the crank-shaft, its crank-pins $a$ and $b$, levers D and E, rods $h h'$, and hand-lever F, with the chain-shaft N, heddle-jacks, and drop-box jacks, and mechanism whereby the said shaft and jacks are operated from the said levers D and E, substantially as described.

2. The combination of the chain-shaft and its disk provided with pins, the rocking frame R and its pawls, and mechanism for operating the said frame, with a lever, T, having rollers $x' x'$, adapted to the frame, and with mechanism for adjusting and retaining the said lever T, all substantially as specified.

3. The combination of the drop-box jacks M M', the pattern-chain P', the pivoted dog 8, the cross-head X', and mechanism for operating the said chain, dog, and cross-head, with the arms 19, fingers 11, mechanism for operating the same, and devices whereby the chain is made to control the fingers, all substantially as specified.

4. The combination of the arms 19, having notches at their lower ends, and mechanism for operating the said arms, with a retainer, 29, adapted to the said notches, and with mechanism for actuating the retainer, substantially as set forth.

5. The combination of the block 17, mechanism for reciprocating the same, and the arms 19, with the lever V', link 14, lever J', and fingers 11, substantially as set forth.

6. The combination of the block 17, and mechanism for operating the same, with the lever J' and its fingers 11, the link 14, and lever V' and its set-screw 18, substantially as specified.

7. The combination of the heddle-jacks, the drop-box jacks, the pattern-chains therefor, slide-rods Q Q² and means whereby they are caused to operate the heddle-jacks, slide-rods Y Y' and means whereby they are caused to operate the drop-box jacks, devices for operating the pattern-chains, and mechanism whereby the two sets of slide-rods are operated independently of each other, as set forth.

8. The combination of the shaft B, having two crank-pins, $a\ b$, the levers D and E, hung to the said pins, the rods $h\ h'$, and hand-lever F, with the rod V, arm 6, and drop-box mechanism, rod S, bar Q, and heddle mechanism, all substantially as set forth.

9. The combination of the jacks, the drop-box, and drop-box rod, mechanism for operating said jacks, the arm L, and the cord K and rollers therefor, with the brake-levers 26, lever U', springs 27, and rod 41, as set forth.

In testimony whereof we have signed our names to this specification in the presence of two subscribing witnesses.

MERRILL A. FURBUSH.
CHARLES H. KNOWLTON.
BENJAMIN F. MEYER.

Witnesses:
HARRY L. ASHENFELTER,
HENRY HOWSON, Jr.